United States Patent
Smirnov et al.

(10) Patent No.: US 9,845,905 B2
(45) Date of Patent: Dec. 19, 2017

(54) RAPID ASSEMBLY FLANGE JOINT

(75) Inventors: Sergey Victorovich Smirnov, St.Petersburg (RU); Vadim Nikolaevich Knizel, St.Petersburg (RU)

(73) Assignee: Electrophor, Inc., Woodmere, NY (US)

( * ) Notice: Subject to any disclaimer, the term of this patent is extended or adjusted under 35 U.S.C. 154(b) by 0 days.

(21) Appl. No.: 13/510,953

(22) PCT Filed: Oct. 6, 2010

(86) PCT No.: PCT/RU2010/000559
§ 371 (c)(1),
(2), (4) Date: May 20, 2012

(87) PCT Pub. No.: WO2011/062519
PCT Pub. Date: May 26, 2011

(65) Prior Publication Data
US 2012/0256417 A1    Oct. 11, 2012

(30) Foreign Application Priority Data
Nov. 20, 2009   (RU) ................................ 2009144014

(51) Int. Cl.
*F16L 23/04*    (2006.01)
*F16L 37/12*    (2006.01)

(52) U.S. Cl.
CPC .......... *F16L 23/04* (2013.01); *F16L 37/1225* (2013.01); *Y10T 29/49826* (2015.01)

(58) Field of Classification Search
USPC ........ 285/407, 411, 413, 415, 406, 365, 364
See application file for complete search history.

(56) References Cited

U.S. PATENT DOCUMENTS

| 2,016,262 | A | * | 10/1935 | Arey et al. ................ 285/415 |
| 2,020,156 | A | * | 11/1935 | Muchnic .................... 285/411 |
| 2,035,221 | A | * | 3/1936 | Cleghorn .................... 285/407 |
| 3,085,820 | A | * | 4/1963 | Pollia ........................ 285/415 |
| 4,452,097 | A | | 6/1984 | Sunkel |
| 4,915,418 | A | | 4/1990 | Palatchy |
| 6,460,901 | B2 | * | 10/2002 | Rochelle .................... 285/415 |

(Continued)

FOREIGN PATENT DOCUMENTS

RU   31428   8/2003
RU   2295666   4/2005

*Primary Examiner* — David E Bochna
(74) *Attorney, Agent, or Firm* — Hoffmann & Baron, LLP

(57) ABSTRACT

The rapid assembly flange joint consists of a connecting device in the form of a constricting collar made up of at least two parts with a shaped groove on the concave face, the groove corresponding to the cross-section of the two coupled flanges of the members that are being connected, and clamping elements in the form of retaining sections on the flanges. The connecting device is provided with fasteners in the form of walls; the retaining sections are in the form of grooves, the width of which is not less than the thickness of the one or two fasteners that engage therewith. The number of grooves is not less than the number of component parts of the connecting device. The rapid assembly flange joint provides for a reliable connection between flanged cylindrical members without the need for additional fastening and clamping elements and without increasing the sizes of the connection point.

20 Claims, 3 Drawing Sheets

(56) References Cited

U.S. PATENT DOCUMENTS

| | | |
|---|---|---|
| 7,007,716 B2 * | 3/2006 | Smahl et al. ............... 285/415 |
| 7,300,078 B2 | 11/2007 | Yamamoto et al. |
| 7,379,293 B2 | 5/2008 | Jang |
| 7,591,489 B2 * | 9/2009 | Woo .......................... 285/413 |
| 7,758,086 B2 * | 7/2010 | Slunick et al. ............. 285/364 |
| 7,798,535 B2 * | 9/2010 | Calhoun .................... 285/411 |
| 8,226,128 B2 * | 7/2012 | Lee ............................ 285/305 |
| 8,248,781 B2 * | 8/2012 | Sun et al. .................. 285/415 |

* cited by examiner

RAPID ASSEMBLY FLANGE JOINT

CROSS-REFERENCE TO RELATED APPLICATIONS

This application is a National Stage entry of International Application No. PCT/RU2010/000559, filed on Oct. 6, 2010, which claims priority to and the benefit of Russian Application No. 2009144014, filed on Nov. 20, 2009. The entire content of these prior applications is incorporated herein by reference.

BACKGROUND

Field

The proposed invention relates to joint devices for fastening a connective joint and can be used for rapid connecting (disconnecting) pipes or cylindrical cases with round flange elements providing a hermetic sealing of their joints.

Related Art

There is a known collar (clamp) for connecting pipes as described in U.S. Pat. No. 7,300,078, "Pipe joint clamp", Denso Corporation, Kariya (JP), IPC F16L 23/00, -23/06, published on 23 Mar. 2006. It consists at least of two parts having a ring internal groove and enveloping closed flanges of connected pipes, wherein collar components are connected between themselves by means of a flexible elastic crosspieces extended out of pipe dimensions (in some cases, they have the form of loops), and the extreme ends of components of a collar have a retaining section and a latch engaged with it. The collar is elastic at the expense of elastic crosspieces, which allows connection of pipes having various is external diameters of flanges.

A disadvantage of this collar for connecting pipes is the impossibility of providing uniform specific pressure on connected surfaces of flange joints at mounting, which can result in arising deformation in a collar cross-section that can, in turn, lead to clearance formation in the latch of the collar and to violation of tightness of the total connection.

There is known also a multiple ring clamp for a cathode ray tube as described in U.S. Pat. No. 7,379,293, "Multiple split ring cathode ray tube clamp", Richco Inc., Morton Grove, Ill. (US), IPC F16L 3/22, published on 20 Sep. 2007. This clamp represents a ring enveloping a "neck" of a tube with joined component rigidly fixed on it (for example, an assembly of printed circuit), wherein clamp ends have engagement sections in the form of inclined teeth.

Such connection is not intended for joining cylindrical parts with flanges on the ends.

There is known a clamp for cables (tubular internal mechanism for windows in a vehicle) as described in U.S. Pat. No. 4,452,097, "Tubular window drive mechanism particularly for motor vehicles also", Brose Fahrzeugteile GmbH (DE), IPC F16C 1/00, -1/26, published on 5 Jun. 1984. The driving mechanism uses a clamp with a latch for connecting wires comprised in a tubular cable having flange projections. The clamp consists of two half rings having an internal ring groove and enveloping closed flanges of connected tubular cables, wherein collar components have projections on the ends, which projections are connected between themselves by an elastic crosspiece on one side, and they have mating latch elements on other side: a clamp in the form of a pin with a plastic cone-shaped tip and a retaining part in the form of a through opening in the projection. Connecting the ends of a clamp occurs closing their projections: the clamp tip on one of projections enters an opening in other projection due to its cone shape and elasticity, and having passed it through, the tip is fixed in that position at the expense of elasticity of a material, since diameter of the tip at its base (at the pin) is a little bit greater than diameter of the through opening of the retaining part, i.e., the clamp is latched. Besides, the clamp is provided with a drainage hole in one of its half.

A disadvantage of the described construction is that, at the expense of additional fastening clamp elements, joint overall dimensions are increased. There is known also a hinged device for connecting pipes as described in U.S. Pat. No. 4,915,418, "Hinged pipe coupling", URDAN IND USA, Inc., IPC F16L 17/00, -17/04, published on 10 Apr. 1990.

The hinged device for connection of pipes is accomplished in the form of several (at least two) segments pivotally connected together by means of hooks and loops. All segments of the device have a circular recess, by means of which they are mounted on closed flanges of connected pipes. At the same time, the ends of extreme segments are pulled together by means of fastening elements such as a bolt and a nut. This construction allows operatively forming a joint device for any diameter of pipes at the expense of a set of necessary amount of segments.

A disadvantage of the above-described hinged device is inconvenience of its usage in the conditions of restricted space, since its connecting and fastening elements are arranged on extended parts on the ends of component segments of the device. Another disadvantage of the device is difficult determination of whether the connective joint is closed together sufficiently for providing tightness.

There is known also the invention "Connecting device consisting of two halves" described in Russian Federation patent No. 2295666, registered by name of ABA OF SWEDEN AB [SE], the start date of lifetime of the patent 22 Jan. 2003, published on 20 Mar. 2007, IPC F16L 21/00, F16L 23/04.

This connecting device is intended for fastening the connecting joint and includes two halves connected hingedly with each other. The connecting device is arranged so that, in an operating position, it is engaged with parts of two connection elements which are adjacent to a connecting joint. At the same time, one end of the connecting device has a fixing element arranged in the form of at least one projection, and other end has a retaining part in the form of at least one recess. Projections and recesses are capable of engaging with each other for transferring connecting halves in an engagement. The described construction provides reliability of connection at the expense of an arrangement of the fixing element and the retaining part. However, the fixing element (projections) and the retaining part (recesses) of the connecting device are arranged on projections that are normal to the plane of flanges, which arrangement increases joint point dimensions.

The closest to the proposed invention and received as a prototype is a "Device for connecting round flange elements", as described in materials of the Russian Federation certificate for utility model No. 31428, registered by name of "Penztiajpromaramatura", Ltd., with the date of priority of 30 Jan. 2003, IPC F16L 23/04, published on 10 Aug. 2003.

This device comprises a constricting collar accomplished at least from two half rings with a shaped recess on concave surfaces matching an enveloped profile of closed flange elements, and fixture for collar contraction (studs, screw nuts). At the same time, the curvature radius of the shaped recess internal surface in each part of the collar in the unclenched position is greater than external surfaces radius of edges of flanges connected between themselves.

The latter connecting device is difficult in manufacture, since connection elements have a complicated configuration of details. Elements of fixture in the form of studs with screw nuts and washers increase joint point dimensions. At the same time, process of connecting (disconnecting) flange elements by means of the fastening elements does not allow realization of the process quickly enough.

Connections with collars are convenient in usage, generally due to fast connecting. However, their applicability is limited by connections that include different fixation elements: bolts, screws, studs, handles, latches, which considerably increase connection dimensions.

SUMMARY

An object of the claimed invention is creation of a rapid assembly flange joint which does not require secondary fixing members for fixation of connected elements, and which does not increase joint point dimensions.

The aforesaid object is achieved for connection of cylindrical elements with round flanges on the ends by a flange joint provided with fixing elements consisting of flanges arranged on end surfaces of connected elements and a connecting device accomplished in the form of a constricting collar, which collar consisting at least from two parts with a shaped annular recess on concave surfaces, which annular recess is matched to enveloped two closed flanges of connected elements in sizes and a cross-section profile, wherein, according to the invention, the annular recess curvature radius in each of parts of the connecting device is equal to radius of external surfaces (edges) of flanges of connected elements, wherein the fixing elements are accomplished in the form of retaining parts on the flanges and retention pins capable of engaging therewith on the connecting device, wherein retention pins are accomplished in the form of the transverse face walls with height equals to depth of a recess on the ends of components of the connecting device, and retaining parts are provided in the form of grooves similarly spaced from each other and equal to each other, the grooves arranged on connected flanges and having width not less than thickness of one or two retention pins intended for engaging therewith, and wherein the grooves are accomplished on both flanges, and their number is not less than amount of components of the connecting device, and distances between the grooves, at their minimum amount, are equal to length of matching components of the connecting device on an external surface (edge) of flanges.

In a particular case, components of the connecting device envelop in the amount not less than half of circumference of flanges to be connected.

Thus, in the proposed rapid assembly flange joint, according to the invention, what is new is that retention pins for fixing a position in the constricting collar are arranged directly on its components, while retaining parts in the form of grooves intended to engage with retention pins are arranged on flanges of elements to be connected.

Connection and fixing of cylindrical elements with round flanges on the ends is carried out as follows. At first, flanges of elements to be connected are aligned so that grooves on them coincide. Then, one of components of the connecting device (for example, a half ring) is oriented correspondingly over an edge of the closed flanges; then one of retention pins made up in the form of the transverse face wall on any of its ends is inserted into one of the aligned grooves arranged on the closed flanges. Then, with use of external force of the arm of the person, the second retention pin arranged on the other end of the connecting device component is inserted into the other matching aligned groove on the closed flanges using its elastic deformation, as a result of which there is a latching of the component. The aforesaid operations are carried out in relation of all components of the connecting device, thus realizing connection of closed flanges circumferentially. That is, assembly of the proposed flange joint is carried out very quickly, since it does not require any exact settings, fittings, and screwing.

Wherein, as the shaped annular recess on concave surfaces corresponds to two closed flanges in the sizes and cross-section profiles, the connecting device (collar components) envelops flanges of units to be connected, fixing and retaining them in axial direction.

At the same time, components of the connecting device in the proposed rapid assembly flange joint can differ from each other in length, and the number of grooves on flanges to be connected can be more than involved in the assembled flange joint.

However, in order for the flange joint to be assembled, the number of grooves arranged on both flanges are not less than the number of components of the connecting device, i.e., minimal number of grooves corresponds to the number of engaging therewith retention pins (one or two) of components of the connecting device (collar), and distances between grooves at their minimal number are equal to length of corresponding components of the connecting device arranged on an external surface (edge) of flanges, wherein grooves have width not less than thickness of one or two retention pins intended for engaging therewith. Therefore, components of the connecting device (collar) fix and retain flanges of units to be connected in a cross-section due to the proposed construction.

At the same time, axial fixing and transverse fixing mutually reinforce each other and ensure a safe flange joint.

Thus, the construction of the proposed rapid assembly flange joint creates rigid connection and does not require for this purpose secondary fixing members and fixture used in analogues.

Besides, the proposed rapid assembly flange joint has no projecting parts, therefore it does not increase joint point dimensions of cylindrical elements (pipelines, cases) having flanges.

It is set forth experimentally, that for providing safe connection, it is optimum for accomplishment of the rapid assembly flange joint, when components of the connecting device envelop, in the total, not less than half of circumference of flanges to be connected.

In general case of accomplishment of the rapid assembly flange joint, depth of grooves made up on flanges can be any depth, and in the particular case of accomplishment, depth of grooves corresponds to height of the projection on flanges over the surface of cylindrical elements to be connected, which reinforces their fixation and reliability of connection.

In general case of accomplishment of the rapid assembly flange joint, retention pins of the connecting device and grooves provided on flanges of elements to be connected can have various cross-sections (for example, trapezoidal or the right-angled with a swelling at free edge), not coinciding with each other, and in the particular case of accomplishment, profiles of grooves correspond to profiles of retention pins engaging therewith, which reinforces their fixation and reliability of connection.

In general case of accomplishment of the rapid assembly flange joint, grooves on flanges of elements to be connected can have different width, but not less than thickness of one or two retention pins intended for engaging therewith, and in the particular case of accomplishment, width of grooves intended for engaging with one retention pin corresponds to its thickness, and width of grooves intended for engaging with two retention pins corresponds to thickness of walls of retention pins of two adjacent components of the connecting device, which reinforces their fixation and reliability of connection.

In general case of accomplishment of the rapid assembly flange joint, components of the connecting device can have different length, and in the particular case of accomplishment, all components of the connecting device are equal, which is the most simple technologically.

In general case of accomplishment of the rapid assembly flange joint, grooves on flanges to be connected can have irregular arrangement, and in the particular case of accomplishment, grooves on flanges to be connected are arranged uniformly on an external surface (edge) of flanges, which reinforces fixation and reliability of connection.

In general case of accomplishment of the rapid assembly flange joint, flanges of cylindrical elements to be connected and a shaped annular recess on concave surfaces of the connecting device can have various cross-section profiles (for example, trapezoidal), and in the particular case of accomplishment, the elements have the right-angled profile, which is the most simple technologically.

In general case of accomplishment of the rapid assembly flange joint, retention pins of the connecting device made up in the form of face cross walls on the ends of components, and also retaining parts made up in the form of the grooves arranged on is flanges of elements to be connected, can have various cross-section profiles (for example, trapezoidal or the right-angled with a thickening at free edge), and in the particular case of accomplishment, the elements have the right-angled profile, which is the most simple technologically.

In the particular case of accomplishment of a rapid assembly flange joint, the number of grooves made up on flanges to be connected corresponds to number of components of the connecting device, the width and a profile of grooves corresponds to thickness and profile of retention pins walls of two adjacent components of the connecting device, and components of the connecting device are similar. In this case of accomplishment, components of the connecting device completely envelop flanges along an external surface (edge), which reinforces fixation and reliability of connection as much as possible.

BRIEF DESCRIPTION OF THE DRAWINGS

The present invention is illustrated in the following drawings.

FIGS. 2a-2c are cross-sections of the rapid assembly flange joint shown in:

FIG. 2a as a section plane perpendicular to the plane of the flanges;

FIG. 2b as a plane of the flanges (for a general case); and

FIG. 2c as a plane of the flanges (for a particular case).

FIGS. 3a and 3b are expanded views of the connecting device components in particular implementations shown in:

FIG. 3a in a plane perpendicular to the plane of the flanges; and

FIG. 3b in a plane of the flanges (in a section).

DETAILED DESCRIPTION

Figure 1:
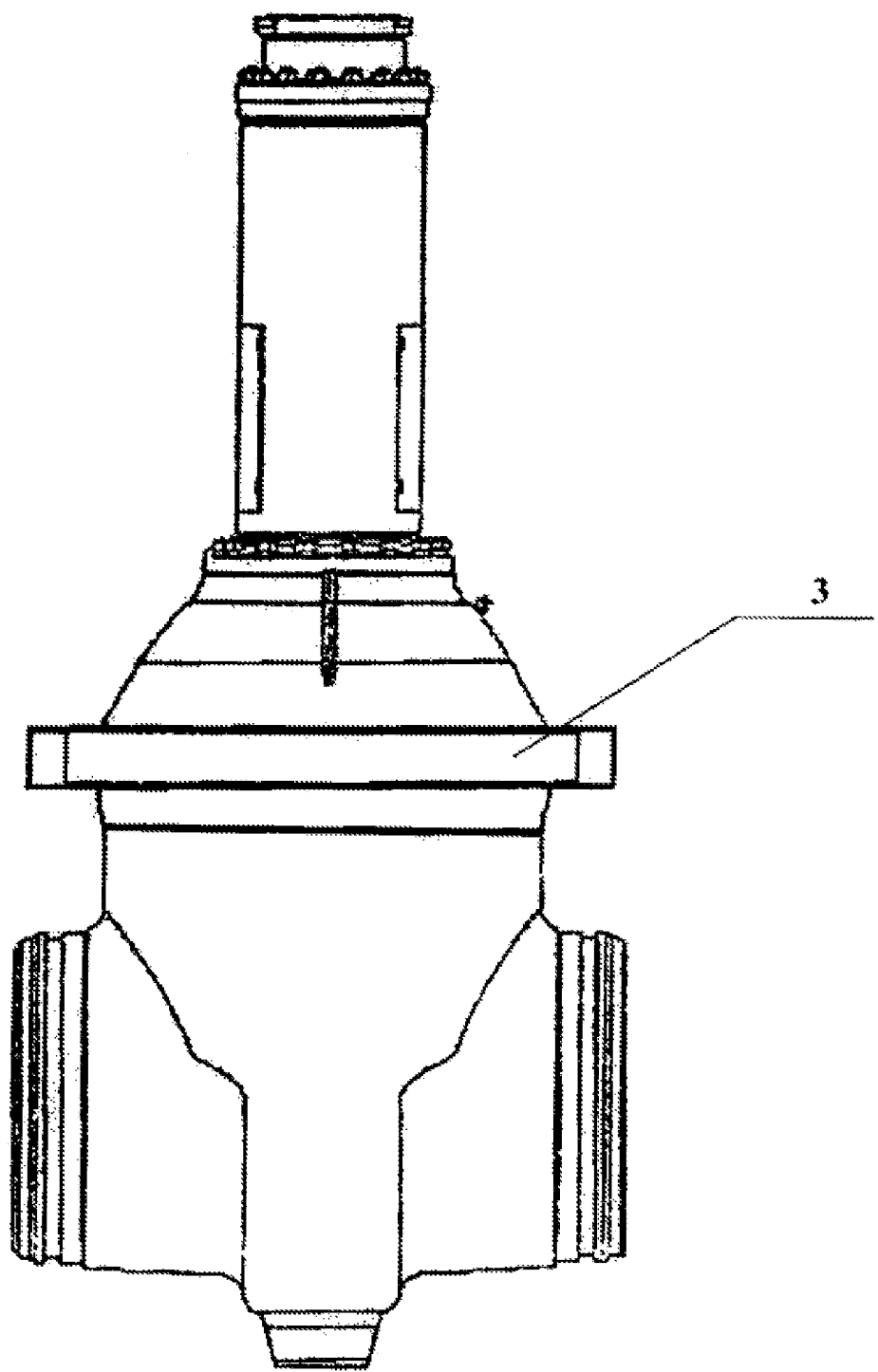
FIG. 1 shows cylindrical elements being connected (bodies of units for water treatment) with flanges, and a rapid assembly flange joint as an assembled unit.
Figure 2A:
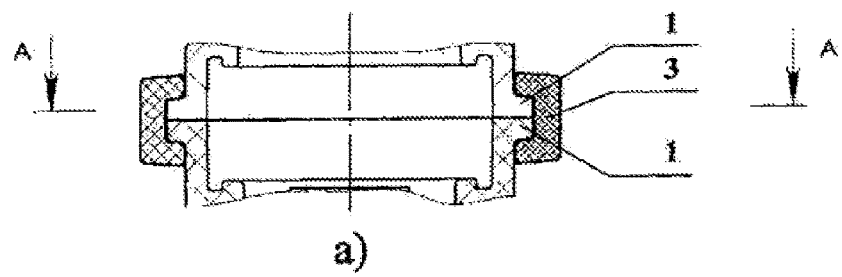
Figure 2B:
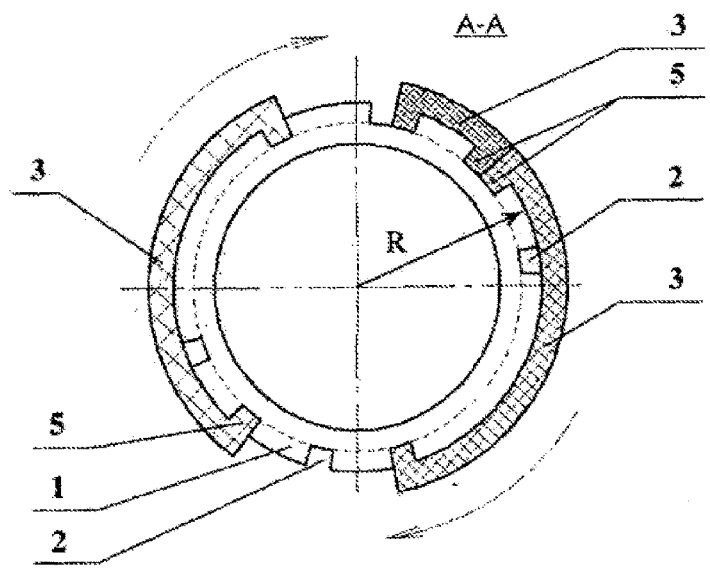
Figure 2C:
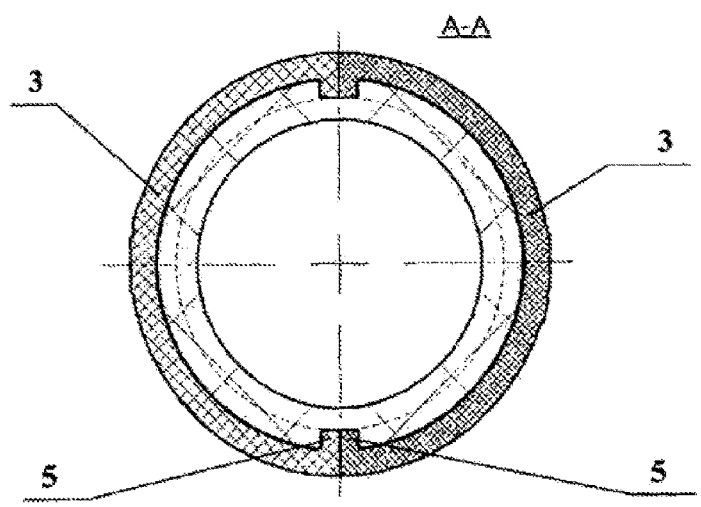
Figure 3A:
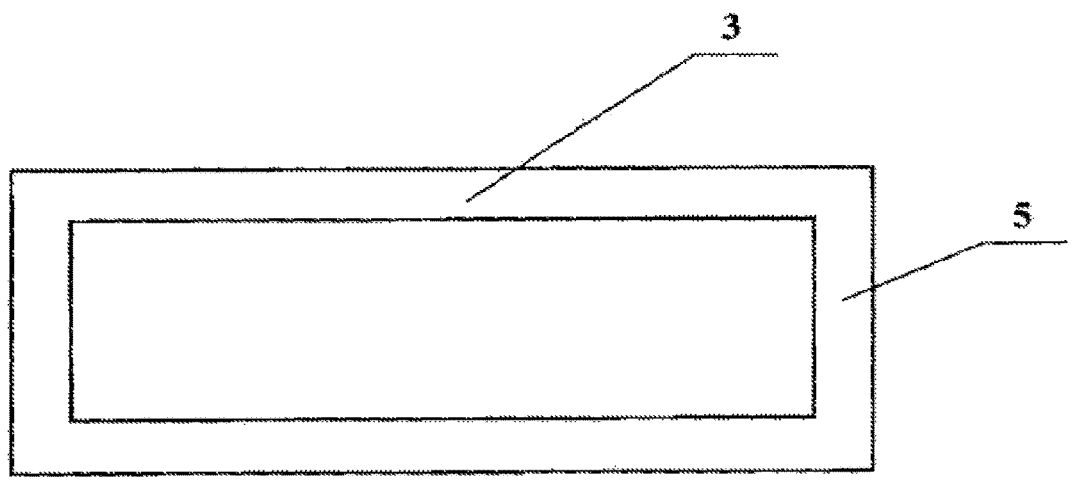
Figure 3B:
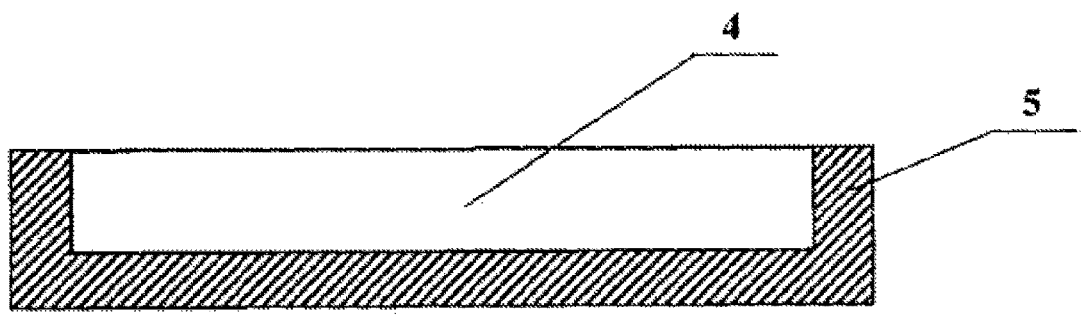

The rapid assembly flange joint (FIGS. 2a-2c) includes: flanges 1 arranged on end surfaces of elements to be connected (FIG. 1), equipped with retaining parts of fixing elements, which retaining parts are implemented as grooves 2, similarly arranged with respect to each other and being of substantially equal size, on flanges 1 to be connected; and connecting device 3 implemented as a constricting collar (clamp) (FIG. 1). Connecting device 3 includes at least of two parts each having a shaped annular groove 4 on a concave surface (FIGS. 2a-2c, 3a, and 3b), which groove corresponds in size and cross-section profile (rectangular profile, in the embodiment shown) to enveloped two coupled flanges 1 of elements being connected, wherein curvature radius R of annular groove 4 in each of the parts of connecting device 3 equals radius R of external surfaces (edges) of flanges 1 of elements being connected. Components of connecting device 3 include fixing elements-retention pins 5, implemented as transverse face walls to depth of recess 4 on the ends of components of connecting device 3 (FIGS. 2, 3a, and 3b). Retaining parts of fixing elements are implemented as grooves 2 on flanges 1 so, that they are capable of engaging retention pins 5 arranged on components of connecting device 3, i.e., flanges 1 of elements being connected have the same number of grooves 2 which are similarly positioned with respect to each other and are of substantially equal dimensions. Grooves 2 are implemented on both flanges 1 in numbers no less than the number of components of connecting device 3 (FIG. 2b), and the distances between said grooves, at their minimum number, are equal to the length of corresponding components of connecting device 3 along external surface (edge) of flanges 1.

In a specific embodiment of the rapid assembly flange joint, components of connecting device 3 envelop, in the total, no less than a half of the circumference of flanges 1 being connected, which does not affect the composition of the elements of the device of the present invention.

In other specific embodiments of the rapid assembly flange joint, the depth of grooves 2 corresponds to the height of a projection of flanges 1 over the surface of cylindrical elements being connected, profiles of grooves 2 correspond to profiles of retention pins 5 engaging the grooves (rectangular profiles, in the particular case), sizes of grooves 2 intended for engaging one retention pin 5 correspond to its thickness, and sizes of grooves 2 intended for engaging two retention pins 5 correspond to the thickness of walls of retention pins 5 of two adjacent components of connecting device 3 (FIG. 2b), which does not limit the composition of the elements of the device of the present invention.

is In other specific embodiments of the rapid assembly flange joint, grooves 2 are arranged uniformly on flanges 1 being connected on an external surface (edge) of flanges 1, or components of connecting device 3 have equal lengths (FIG. 2c), which does not limit the composition of the elements of the device of the present invention.

In a specific embodiment of the rapid assembly flange joint, the number of grooves 2 on flanges 1 being connected corresponds to the number of components of connecting device 3, width and profile of grooves 2 correspond to the thickness and profile of the walls of retention pins 5 of two adjacent components of connecting device 3, and components of connecting device 3 have equal length (FIG. 2c), which does not limit the composition of the elements of the device of the present invention.

The rapid assembly flange joint is used for connecting and disconnecting cylindrical elements having round flanges on their ends.

Connection and joint fixing is carried out as follows. At first, flanges 1 of elements being connected are aligned, such that their grooves 2 coincide. Then, one of the components of connecting device 3 (for example, a half ring) is oriented appropriately over the edge of closed flanges 1, one of retention pins 5 made up in the form of a transverse face wall on any of its ends is inserted into one of aligned grooves 2 of closed flanges 1. After that, with the use of external force of the user's arm, the second retention pin 5 on the other end of one of the components of connecting device 3 is inserted into another corresponding aligned groove 2 of closed flanges 1, and because of its elastic deformation, latching of this component therefore takes place. The same operations are performed with other components of connecting device 3, realizing connection of closed flanges 1 along their circumference.

As all aforesaid operations are carried out manually, which do not require exact settings, adjustments, do not use independent fastening elements such as screws, bolts, screw nuts, studs, etc., and also do not require special instruments, the assembly of the flange joint of the present invention is carried out very rapidly.

Flange joint disconnection is carried out also simply and quickly enough: for this purpose, one of the retention pins 5 of any component of connecting device 3 is extracted from the aligned groove 2 of closed flanges 1 using a screwdriver, therefore unlatching (disconnecting) this component. Disconnection of other components of connecting device 3 is carried out in a similar fashion.

Thus, both in a general implementation and in all specific embodiments, use of the proposed rapid assembly flange joint is carried out similarly.

Therefore, the present invention provides for obtaining a rapid assembly and quick disconnect flange joint, simple in manufacture and usage, ensuring safe fixing of elements which are to be connected and not increasing junction point dimensions of cylindrical elements (pipelines, housings) having round flanges.

In spite of the fact, that the present invention has been illustrated with particular implementations and embodiments, which are considered now as most practically favorable and preferable, one needs to understand, that the present invention is not limited by the described embodiments, and on the contrary includes various modifications and versions within the limits of the subject matter and the scope of the proposed set of claims.

For the purpose of implementation of the present invention of a rapid assembly flange joint, as in general and particular cases of implementation, materials and elements known in the field of water purification can be used.

Thus, cylindrical elements which are to be connected (pipelines, housings) having round flanges can be, for example, made of plastic for injected casting, for example, polypropylene, or any other constructional material, for example polyamide.

Components of a constricting collar (clamp, i.e. the connecting device) can be made of an elastic material, for example polyoxymethylene (POM K500 Kolon Industry), which is allows assembly and disassembly of the flange joint of the present invention without permanent distortions and destructions of the connecting device (collar).

The invention claimed is:

1. A rapid assembly flange joint, comprising:
   a first cylindrical element having a first end surface with
      a first flange having a first external perimeter comprising a first set of at least two separate grooves;
   a second cylindrical element having a second end surface with a second flange having a second external perimeter being substantially identical to the first external perimeter, and comprising a second set of grooves as to mirror the arrangement of said first set, such that said second external perimeter, including said second set, is capable of being aligned with said first external perimeter, including said first set, when said second flange is facing and contacting said first flange;
   a connecting device comprising a first clamp having a first elongated concave surface terminating with a pin on either end thereof and comprising a first elongated annular recess, and a second clamp having a second elongated concave surface terminating with a pin on either end thereof and comprising a second elongated annular recess;
   wherein said first elongated annular recess is complementary to and capable of enveloping a combined portion of said first flange and said second flange between two successive grooves on said first external perimeter and said second external perimeter when said second external perimeter, including said second set, is aligned with said first external perimeter, including said first set, when said second flange is facing and contacting said first flange and when said successive grooves are engaged by terminal pins of said first clamp; and
   wherein said second elongated annular recess is complementary to and capable of enveloping another combined portion of said first flange and said second flange between another two successive grooves on said first external perimeter and said second external perimeter when said second external perimeter, including said second set, is aligned with said first external perimeter, including said first set, when said second flange is facing and contacting said first flange and when said another successive grooves are engaged by terminal pins of said second clamp.

2. The rapid assembly flange joint of claim 1, wherein said at least two grooves of said first set and said at least two grooves of said second set are of substantially equal size and shape.

3. The rapid assembly flange joint of claim 1, wherein said connecting device is capable of enveloping at least a half circumference of said first and second flanges combined and aligned when said first flange is facing and contacting said second flange.

4. The rapid assembly flange joint of claim 1, wherein said grooves have a depth corresponding to a projection height of said first and second flanges over an exterior of said first and second cylindrical elements to be connected when said first flange is facing and contacting said second flange and said first and second flanges are aligned.

5. The rapid assembly flange joint of claim 1, wherein a groove of said first set when aligned with a groove of said second set have a combined profile complementary with a combined profile of all pins engaging therewith.

6. The rapid assembly flange joint of claim 1, wherein a groove of said first set when aligned with a groove of said second set have a combined profile complementary with a single pin only.

7. The rapid assembly flange joint of claim 1, wherein said first set of grooves and said second set of grooves are arranged equidistantly along said first external perimeter and said external perimeter, correspondingly.

8. The rapid assembly flange joint of claim 1, wherein said first and second flanges and said first and second elongated annular recesses have rectangular cross-section profiles.

9. The rapid assembly flange joint of claim 1, wherein said first clamp and said second clamp are substantially identical.

10. The rapid assembly flange joint of claim 1, wherein said pin is an end transversal wall terminating said first or second clamps, and wherein at least one said groove of said first or second sets has a rectangular cross-section profile.

11. The rapid assembly flange joint of claim 1, wherein said connecting device comprises two identical clamps and said first set and said second set each comprise two identical grooves opposing each other.

12. A method for a flange joint rapid assembly, comprising:
selecting a first cylindrical element having a first end surface with a first flange having a first external perimeter comprising a first set of at least two separate grooves;
selecting a second cylindrical element having a second end surface with a second flange having a second external perimeter being substantially identical to the first external perimeter, and comprising a second set of grooves as to mirror the arrangement of said first set, such that said second external perimeter, including said second set, is capable of being aligned with said first external perimeter, including said first set, when said second flange is facing and contacting said first flange;
selecting a connecting device comprising a first clamp having a first elongated concave surface terminating with a pin on either end thereof and comprising a first elongated annular recess, and a second clamp having a second elongated concave surface terminating with a pin on either end thereof and comprising a second elongated annular recess, wherein said first elongated annular recess is complementary to and capable of enveloping a combined portion of said first flange and said second flange between two successive grooves along said first external perimeter and said second external perimeter when said second external perimeter, including said second set, is aligned with said first external perimeter, including said first set, when said second flange is facing and contacting said first flange and when said successive grooves are engaged by terminal pins of said first clamp, and wherein said second elongated annular recess is complementary to and capable of enveloping another combined portion of said first flange and said second flange between another two successive grooves along said first external perimeter and said second external perimeter when said second external perimeter, including said second set, is aligned with said first external perimeter, including said first set, when said second flange is facing and contacting said first flange and when said another successive grooves are engaged by terminal pins of said second clamp;
aligning said second external perimeter, including said second set, with said first external perimeter, including said first set, while facing and contacting said second flange with said first flange;
engaging said two successive grooves from said first set aligned with grooves from said second set with said terminal pins of said first clamp while enveloping said combined portion of said first flange and said second flange between said two successive grooves along said first external perimeter and said second external perimeter with said first elongated annular recess; and
engaging said another two successive grooves from said first set aligned with grooves from said second set with said terminal pins of said second clamp while enveloping said another combined portion of said first flange and said second flange between said two successive grooves along said first external perimeter and said second external perimeter with said second elongated annular recess.

13. The method of claim 12, wherein in said at least two grooves of said first set and said at least two grooves of said second set are of substantially equal size and shape.

14. The method of claim 12, wherein a groove of said first set when aligned with a groove of said second set have a combined profile complementary with a combined profile of all pins engaging therewith.

15. The method of claim 12, wherein a groove of said first set when aligned with a groove of said second set have a combined profile complementary with a single pin only.

16. The method of claim 12, wherein said first set of grooves and said second set of grooves are arranged equidistantly along said first external perimeter and said second external perimeter, correspondingly.

17. The method of claim 12, wherein said pin is an end transversal wall terminating said first or second clamps, and wherein at least one groove of said first or second sets has a rectangular cross-section profile.

18. The method of claim 12, wherein said first and second flanges and said first and second elongated annular recesses have rectangular cross-section profiles.

19. The method of claim 12, wherein said connecting device comprises two identical clamps and said first set and said second set each comprise two identical grooves opposing each other.

20. A rapid assembly flange joint, comprising:
a first cylindrical element having a first end surface with a first flange having a first external perimeter comprising a first set of at least two separate grooves having substantially equal size and shape and equidistantly distributed along said first external perimeter;
a second cylindrical element having a second end surface with a second flange having a second external perimeter being substantially identical to the first external perimeter, and comprising a second set of grooves of substantially identical size and shape and mirroring the arrangement of said first set, such that said second external perimeter, including said second set, is capable of being aligned with said first external perimeter, including said first set, when said second flange is facing and contacting said first flange;
a connecting device comprising a plurality of substantially identical clamps, which quantity being equal to the number of grooves in said first set, each clamp having an elongated concave surface comprising an elongated annular recess and terminating with an end transversal wall on either end thereof; and
wherein said elongated annular recess is complementary to and capable of enveloping a combined portion of said first flange and said second flange between two successive grooves on said first external perimeter and said second external perimeter when said second external perimeter, including said second set, is aligned with said first external perimeter, including said first set, when said second flange is facing and contacting said first flange and when each of said successive grooves is engaged by end transversal walls of two successive clamps simultaneously.

* * * * *